H. M. KEITH.
Fertilizer.
No. 44,635.
Patented Oct. 11, 1864.
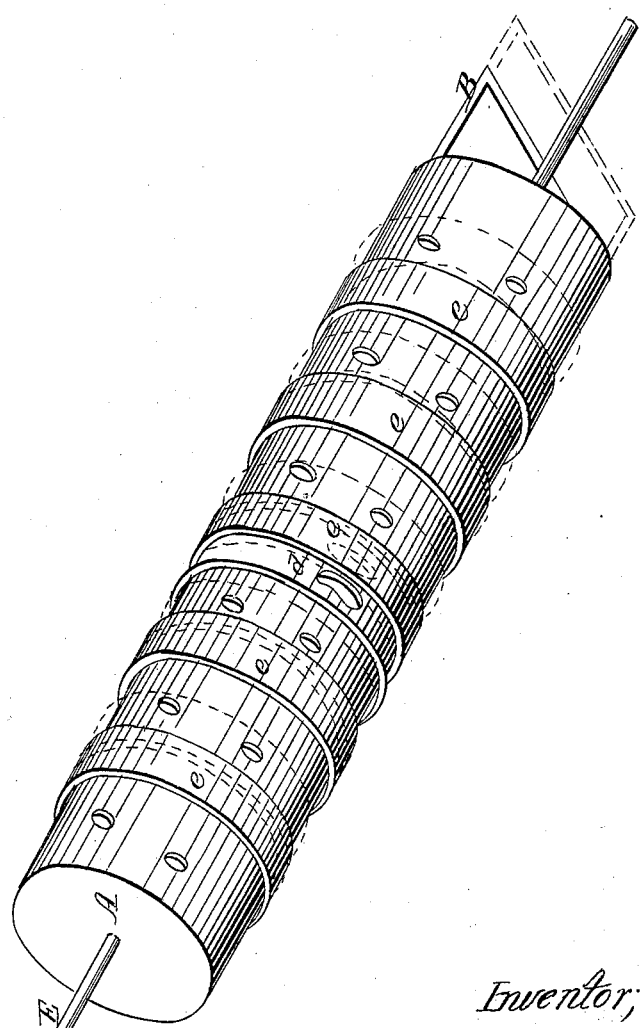

UNITED STATES PATENT OFFICE.

HORACE M. KEITH, OF PONTIAC, MICHIGAN.

DISTRIBUTING FERTILIZERS.

Specification forming part of Letters Patent No. 44,635, dated October 11, 1864.

*To all whom it may concern:*

Be it known that I, HORACE M. KEITH, of Pontiac, in the State of Michigan, have invented certain new and useful Improvements in Machines for Distributing Fertilizers; and I hereby declare that the following is a true and exact description of the same, reference being had to the accompanying drawings, and to the letters of reference marked thereon.

The nature of my invention consists of certain mechanical devices by which the quantity of fertilizing material sown can be regulated.

Figure 1 in the annexed drawings represents a perspective view of my invention, which consists of the cylinder A, the metal rod B, and the bands C. The cylinder A has a series of holes in its circumference, intended as vents to the plaster or other fertilizing substance within the cylinder. These holes are arranged in circles parallel with the ends of cylinder A and at a suitable distance apart. Midway of the length of cylinder A there is an oblong perforation made, through which the fertilizer is introduced into the cylinder. At the point of the perforation above mentioned a metal band, *d*, surrounds cylinder A, having a hole through it corresponding in size with the perforation in the cylinder. The band *d* is made to slide easily around the surface of cylinder A, so that when the material has been introduced in the cylinder the band *d* can be moved backward or forward, so as to cover the hole, and thus prevent the escape of the fertilizing substance within.

B represents a forked rod, the two prongs of which extend the whole length of cylinder A. These prongs are placed exactly opposite to each other on the periphery of the cylinder, and far enough from it to admit of the concentric bands *e* to be introduced between them and the surface-cylinder A. The bands *e* are soldered to the under surface of the prongs of rod B, and are designed to correspond in distance apart with the circles of holes in cylinder A, so that by a lateral movement of the forks the holes in cylinder A can be partially or entirely covered by the concentric bands *e*. It will be seen that by this arrangement the quantity of fertilizing material can be regulated to suit the condition of the soil with as much precision as if it were sown by hand. My cylinder is intended as an attachment to any wheel-vehicle used in farming operations, and is turned by a pulley on axle E.

Having thus described my invention, what I claim, and desire to secure by Letters Patent, is—

The cylinder A, the forked rod B, the bands *e*, and band *d*, the whole arranged, constructed, and operated substantially as herein set forth.

HORACE M. KEITH.

Witnesses:
T. A. FLOWER,
FRED. PAGE.